United States Patent Office 3,409,198
Patented Nov. 5, 1968

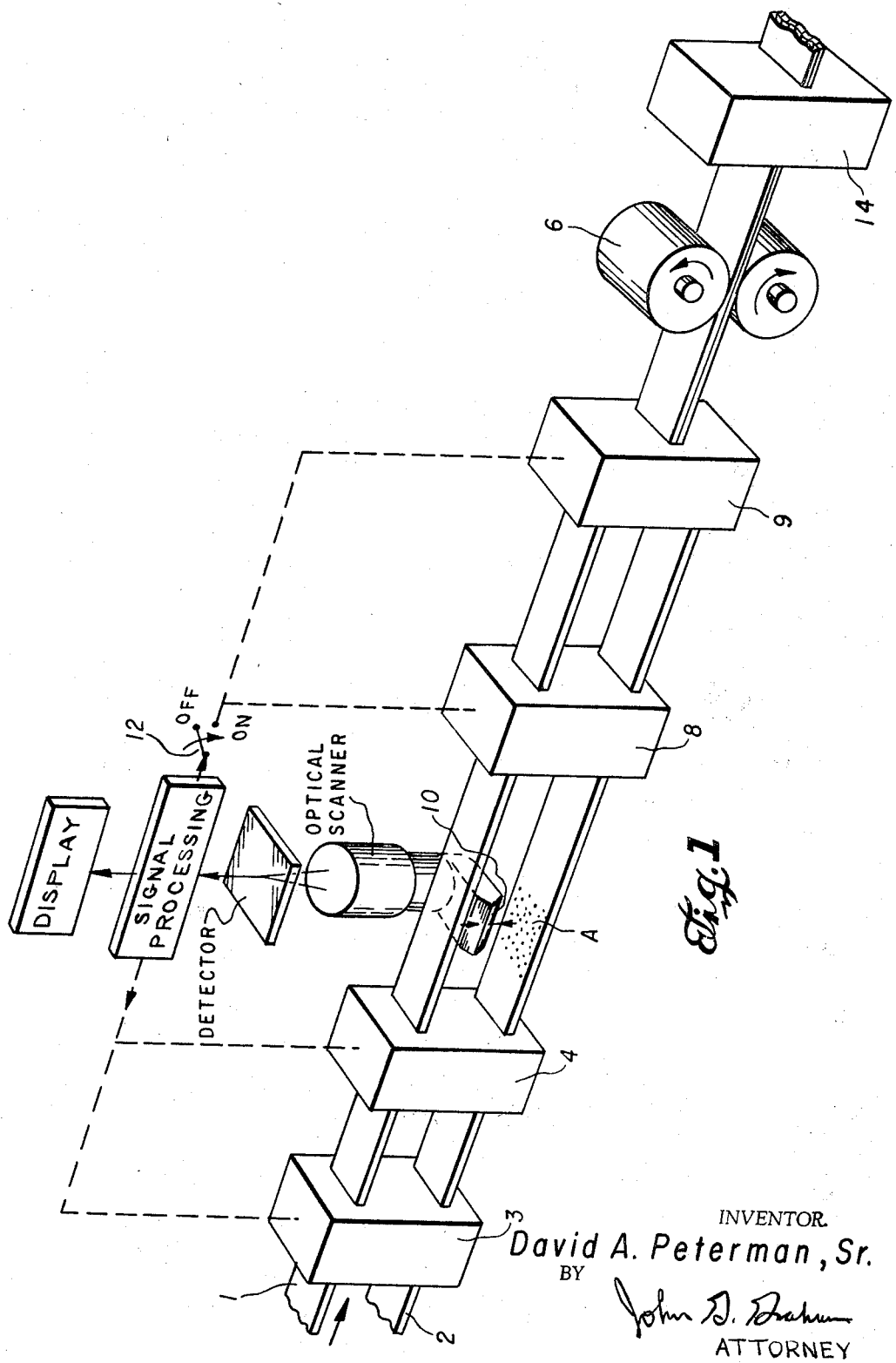

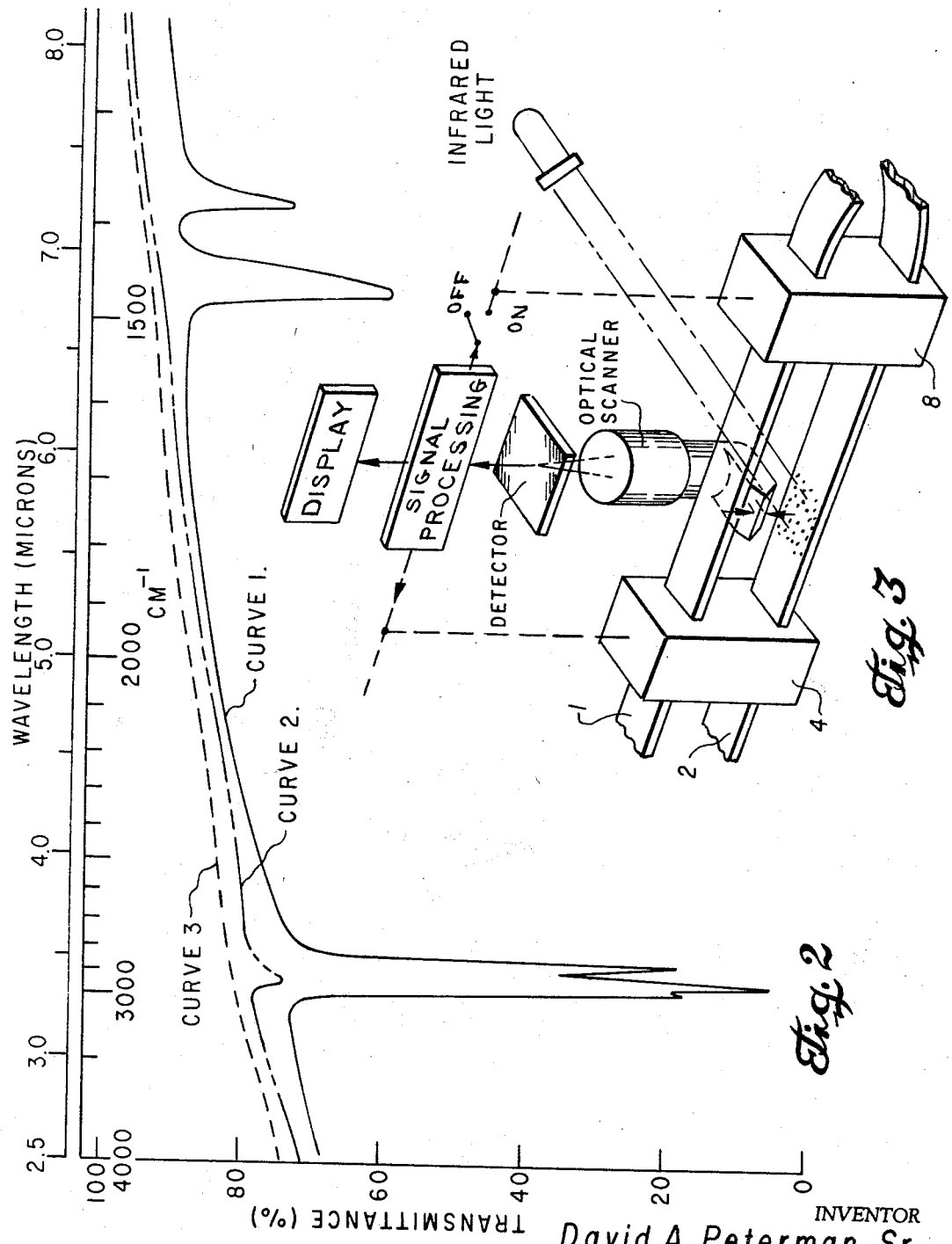

3,409,198
BONDING APPARATUS WHICH ASSURES
BONDABILITY
David A. Peterman, Sr., Richardson, Tex., assignor to
Texas Instruments Incorporated, Dallas, Tex., a corporation of Delaware
Filed Apr. 30, 1965, Ser. No. 452,138
2 Claims. (Cl. 228—9)

This invention relates to bonding, and more particularly to a bonding method which assures substantially complete bondability between two or more materials.

There are numerous manufacturing processes in various areas of technology wherein two or more materials are to be joined or bonded together to form a composite or laminated structure. In many cases it is critical to the use of the resulting structure that there be a complete, uniform bond between the constituent materials. This objective, however, is often thwarted by the presence of certain bond-deterrent contaminants upon the surfaces of the materials to be bonded as well as by surface roughness of the materials. For certain bonding processes, for example, particularly cold welding, brazing, adhesive bonding, techniques, etc., if there is contamination or surface roughness, the parts will not bond. Meticulous preparation of the surfaces prior to the actual bonding operation, directed at removing surface roughness and contaminants which act as barriers to uniform bonding is therefore absolutely necessary.

In particular, the required removal of the contaminants depends largely upon the type of bonding operation involved. For example, when a resistance or induction welding process is used, it is important to remove foreign materials such as oil, grease, paint, and ordinary rust. On the other hand, in cold welding or adhesive bonding, oxide films, adsorbed films, and heavy soap emulsions or soap-based compounds should be removed in addition to any oil, grease, paint or general dust. The particular methods of precleaning and surface preparation employed in a bonding process are therefore directed at removing those contaminants which are detrimental to bonding in that particular process.

The methods directed at assuring substantially complete uniform bonding between the constituent materials have generally been limited to these careful precleaning procedures prior to the actual bonding, and thereafter visibly inspecting the surfaces to be bonded for any unremoved contaminants or surface roughness. Beyond these steps, however, there is no assurance of complete bonding of the surfaces other than by checking for non-bonds subsequent to the bonding operation. Consequently, when two pieces of metal, for example, are to be bonded, and the metals are subjected to what is thought to be a thorough precleaning and surface preparation, thin molecular films or surface roughness invisible to the eye will often prevent a perfect bond between the metals.

It is therefore an object of this invention to provide a method whereby substantially complete uniform bonding between two or more materials may be assured.

It is another object of the invention to provide a method of scanning the surfaces of two or more materials to be bonded prior to the actual bonding operation to detect the presence of any contaminants or surface roughness invisible to the eye.

It is a further object of the invention to provide a method of controlling the precleaning and surface preparation operations prior to the actual bonding operation, said control being maintained in response to the sensing of the characteristics of the surfaces of the materials to be bonded.

In accordance with these as well as other objects and features, my invention involves scanning the surfaces of the metals or other materials to be bonded, prior to the actual bonding operation, with apparatus sensitive to variations in the emittance or reflectance of energy in specified regions of the electromagnetic spectrum, in order to detect the presence of surface roughness or contaminants which impede the bonding of the materials.

Emittance (or reflectance) of energy from a surface depends upon, among other factors, material composition and surface roughness. With regard to the former, each material, whether it be a single element or a complex compound, has characteristic energies associated with its molecular structure which serve as an indicator or "fingerprint" of that material. For example, a molecule may be excited to rotational motion, and this motion is imparted by energy in the microwave-frequency range. Another kind of energy existing in the molecule which can stimulate the molecule by added energy is vibrational energy. The frequency of this energy is in the infrared range. Energy in the ultraviolet and visible range, on the other hand, raises the energy level of valence or outer electrons in a compound to an excited state. Each compound or element, therefore, is distinctive in that it absorbs various amounts of energy at particular frequencies or wavelengths in the electromagnetic spectrum. By ascertaining the absorption pattern of an unknown material, and comparing it to known absorption patterns, the particular material may be identified.

This technique proves exceptionally useful in a bonding process. Let us assume that for a particular bonding operation to join two metals, the presence of contaminants having the carbon-hydrogen bond (e.g. oil, greases, varnishes, paints) will prevent the complete and uniform bonding of the two metals. After the precleaning and surface preparations, the two metals will pass under an infrared scanner, for example, one which would be "looking" for the 3.3 micron absorption band characteristic of the carbon-hydrogen bond. The presence of this band will therefore indicate that previous precleaning and surface preparations had been insufficient to remove these undesirable contaminants, and the surfaces will then be recycled through other appropriate cleaning steps. The absence of the 3.3 micron absorption band on the other hand, would indicate a surface free of these contaminants, and if there were no other contaminants present, the metals would continue to be joined together by the particular bonding operation such as welding, brazing, etc. As will be subsequently described, the presence of contaminants upon the surfaces may be detected by a variation in emittance in the case of a passive detection system, or by a variation in reflectance in the case of an active system using an auxiliary source of electromagnetic radiation. However, and as will be subsequently pointed out, with the use of reflection techniques (active system) surface roughness may also be detected.

The scanning process of this invention, therefore, provides a method for assuring bondability of two or more materials. As will be later observed, this process may be continuous, thereby avoiding the necessity for halting the bonding operation and incurring needless expense due to the resulting shut-down. By selecting the proper scanning devices (infrared scanners, ultraviolet scanners, etc.) respectively sensitive to absorption bands at desired wavelengths, the presence of certain oxides, soap emulsions, and vegetable oils, for example, may be quickly detected and removed prior to actual bonding. Through the use of control system techniques known in the art, the scanning apparatus will additionally regulate the various precleaning and surface preparation steps.

The novel features believed to be characteristic of this invention are set forth in the appended claims. The invention itself, however, as well as other objects and advantages thereof, may best be understood by reference to the following detailed description of illustrative embodiments, read in conjunction with the accompanying drawings wherein:

FIGURE 1 is a schematic representation of a bonding process utilizing the principles of the invention;

FIGURE 2 is a series of curves showing the absorption characteristics of a surface at various degrees of contamination; and FIGURE 3 shows the application of a reflection technique in the method of the invention.

Although the invention is applicable to many bonding processes and materials to be bonded, the following description illustrates the invention by way of example, and not by limitation in conjunction with a solid phase metal bonding process such as that disclosed in U.S. Patent No. 2,691,815, to Boessenkool et al., assigned to the assignee of this application.

Referring to FIGURE 1, there is depicted the major steps in the process:

(1) Precleaning and preparing the surfaces of the metals to be bonded by eliminating contaminants that would otherwise act as a barrier to bonding;

(2) Scanning the surfaces of the metals with an infrared detection system of determine whether the surface precleaning and preparation procedures completely removed the undesirable contaminants;

(3) Recleaning the surfaces of the metals to completely remove those contaminants detected by the previous step;

(4) Deforming the metals (while maintaining their surfaces in the prepared condition) by squeezing them together, thereby increasing their interfacial surface area, and forming isolated or discrete bond spots (referred to as "nucleal bonds");

(5) Heating or sintering the metals as held together by the "nucleal bonds" to cause a growth or spread of the area of the bonds to increase the overall strength of the bonding.

It is important to a complete bond between the two metal strips 1 and 2 that their surfaces be not only free from gross contaminants such as grease, oil, paint and general dust and dirt, but also from "barrier films." By "barrier films" is meant films, not necessarily continuous, which approach molecular dimensions in thickness, resist ordinary cleaning methods, and are deterrents to bonding. Typical of these barrier films are long chain polar molecules, natural oxide and compound films both of which are, as a rule, hydrated; and chemisorbed layers and adsorbed layers of liquids and gases.

In order to remove both the gross contaminants and the "barrier films," the metal strips 1 and 2 first travel through a precleaning apparatus 3 which removes the gross contaminants. This removal is by any suitable means taught by the prior art, as, for example, by spray cleaning or vapor degreasing equipment. The metal strips 1 and 2 then advance to the surface preparation apparatus 4 which proceeds to remove the "barrier films." There are several methods for removing the barrier films, among which may be mentioned bright annealing after conventional cleaning, pickling followed by a heating step to remove the film caused by such immersion, or an abrasion method such as wire brushing. A more particular description of preferred methods of and means for removing the barrier films may be found in the aforementioned Patent No. 2,691,815.

After the metal strips 1 and 2 have proceeded through the precleaning and surface preparation operations, they come to the second step of the bonding process, namely the scanning of their surfaces by a scanning system, and in particular an infrared scanning system. As previously mentioned, all materials have characteristic energies associated with them, which are recognizable by a spectral analysis of their radiation within the various regions of the electromagnetic spectrum. For example, all materials whose temperatures are above absolute zero radiate energy throughout the infrared region. Different materials, however, will absorb radiation at various wavelengths within this region due to the characteristic vibrations of their molecules. An analysis of this absorption gives both qualitative and quantitative information about the particular material involved. For instance, if the infrared radiation characteristics of a material having a carbon-hydrogen bond were studied, a substantial decrease in infrared radiation would be detected at approximately $3.3\mu$, this decrease at this wavelength being referred to as an absorption band. In like manner, if the surface of a metal, for example, is scanned, and this absorption band is detected, the presence of oil films, paints, and/or lacquers, etc. (all containing the carbon-hydrogen bond) is consequently detected, and may be removed by various techniques. To illustrate this point, a sample of Kovar #4 (polished on a diamond wheel) was coated with a film of Duo Seal Vacuum Pump Oil, and its radiation characteristics were measured. The curve is shown in FIGURE 2 as Curve 1. The characteristic absorption band at approximately $3.3\mu$ was noted. The surface was then wiped with a tissue, and the radiation characteristics again measured, these characteristics being shown as Curve 2. Although the absorption band was reduced in magnitude, its presence was still noted. The sample was finally submitted to a vapor degreasing operation in order to remove all traces of the oil, and the Curve 3 represents the radiation characteristics of the sample after this complete removal, the absorption band at $3.3\mu$ being entirely absent.

Referring again to FIGURE 1, let us assume that even after the precleaning and surface preparation operations previously described have taken place, a thin film of oil not visible to the eye (represented by the dotted outline A) upon the surface of metal strip 2, remains. Prior to this invention, the metal strips 1 and 2 would continue to the reduction rolls 6 to be bonded, the presence of the oil film remained undetected until it was determined that there was an incomplete and nonuniform bond between the metal strips 1 and 2 due to the presence of the oil film contamination. The process of this invention, however, introduces an intermediary step whereby the metal strips 1 and 2, after emerging from the apparatus 4, have their respective surfaces scanned by the system as illustrated in FIGURE 1 in order to determine the presence of any undesirable contaminants (in this case the presence of the oil film) which were not removed by the preceding cleaning steps.

Apparatus for practicing this step comprises an optical scanner, an infrared detector capable of detecting variations in radiation of infrared energy from the metal surfaces being scanned, and a means for processing and displaying the signal received from the detector.

Infrared radiation is emitted from the metal surface 2, including the thin oil film region A, and arrives at the window 10 of the optical scanner. The primary purpose of this scanner is to collimate and focus the incoming infrared energy on the detector, with a minimum of transmission loss. The secondary purpose is twofold: (1) to optically filter out unwanted or background radiation, and (2) to limit the radiation incident on the detector to those wavelengths or wavelength bands that are desired. For example, if the surface is being scanned for the presence of oil films of the type having an absorption band at $3.3\mu$, the optical scanner system should filter out wavelengths other than those immediately surrounding the $3.3\mu$ wavelength band. Both the focusing and the filtering are carried out by a series of lenses, mirrors, and prisms, etc. specifically designed for these purposes. There are many such optical systems known in the art and available on the market which are suitable for use in the practice of this invention.

After passage through the optical scanner system, infrared radiation in the limited wavelength region (in our case the 3–5μ zone) impinges on the sensitive surface of the detector. The purpose of the detector is that of a transducer changing the sensed infrared radiation into a signal voltage output. This output is then available for electronic amplification and use in a form suitable for display. There are various detectors known in the art presently available on the market which may be used to practice the invention. For use within the aforementioned wavelength region, however, it is preferable to use a detector selected from the group of photoconductive cells primarily used in the intermediate-infrared spectral region, for example the lead selenide, lead telluride, indium antimonide, and doped germanium and silicon cells.

The output signal from the detector (containing the information about the presence of the oil film) is ordinarily very weak. In order to utilize it for display purposes or to actuate other systems, amplification is required. Although this may take place in the detector itself in the case of some detectors on the market today, more often the detector output signal is amplified by established electronic techniques and at the same time unwanted background noise is reduced. This latter technique is depicted in FIGURE 1 wherein the output signal of the detector is processed before being displayed.

The amplifier signal, indicating the presence of the surface contamination on the surface of the metal strip 2, is then displayed as shown. Various forms of display may be employed, and may be, for example visual, aural, electrical, photographic, or recorded.

The indication provided by the display informs the attendant that the prior precleaning steps were inadequate, that operations 3 and 4 have to be reset to increase their efficiency and subsequent cleaning operations must be utilized. These subsequent cleaning operations are represented in FIGURE 1 by apparatus 8 and 9. The attendant, upon noting the presence of the contamination, may manually set the apparatus into operation. As a preferred method, however, it is desirable to use the amplified detector signal to automatically control any subsequent operations of apparatus 8 and 9. For example, the cleaning operations represented by apparatus 8 and 9 may be activated by a switch 12 which remains in an "off" position until a certain threshold value signal voltage appears across its terminals. At this threshold value, the switch moves to the "on" position, activating apparatus 8 and 9, causing the metal strips 1 and 2 to be subjected to another precleaning and surface preparation operation to remove the surface contamination previously detected.

Although one such method of control has been described, various other automatic methods of control may be used by which the detection of contaminants upon the surface of materials to be bonded control the cleaning operations. As an alternative method, the signal received from the detector may be used to regulate the initial cleaning apparatus 3 and 4, or a combination of control systems may be utilized to maintain a continuous bonding process with a high yield of uniformly bonded structures.

While the sensing apparatus shown in FIGURE 1 measures the emission of infrared radiation, other types of apparatus are equally applicable to the process of the invention. For example, instead of measuring the emission of a surface, a beam of infrared light, preferably monochromatic, is focused upon the surface of the metal, as shown in FIGURE 3, and the infrared energy reflected by the surface is collected and focused on the detector by the optical scanner system. The absence or substantial reduction of infrared energy of one particular wavelength will then give an indication of the contamination of the surface. In particular, if the presence of a contaminant, as oil, grease, etc., having the 3.3μ absorption band is to be detected, then a monochromatic ray of 3.3μ wavelength is focused upon the surface of the metal strip 2, and its absence or reduction in the reflected radiation denotes the presence of the particular contamination.

In addition to denoting the presence of contamination upon the surface, a measurement of the reflectance from the surface of the materials to be bonded will give an indication of surface roughness. In general, the total reflectance of light from a surface will be different for different wavelengths and different degrees of surface roughness. Therefore, using apparatus, for example, such as that described in Patent No. 3,160,752, dated Dec. 8, 1964, light of specified wavelength is focused upon the metallic surfaces 1 or 2 shown in FIGURES 1 and 3, and the reflected light is analyzed to determine the degree of surface finish. Undesirable surface roughness can then be removed prior to the bonding operation.

Referring now to the final two steps of the bonding process depicted in FIGURE 1, the deformation of the metal strips 1 and 2, and the subsequent heating or sintering of the metals to increase the overall strength of the bonds formed between them during the deformation, reference is had to the aforementioned Patent 2,691,815, wherein these two steps are described with great particularity. In general, the contaminant free metal surfaces proceed to the reduction rolls 6 which press the metals together with great force and simultaneously extend the areas of the mating surfaces. This increase of interfacial surface area, among other things, forms discrete nucleal bonds between the metals. The bonded metal strips then pass into the apparatus 14 where they are heat-treated or sintered so as to transform the discrete bonds into a continuous bond, as described in the aforementioned patent. Because undesirable contaminants and surface roughness were detected and subsequently removed prior to the actual deformation step, a substantially complete and uniformly bonded laminated structure is assured.

As many changes could be made in the above method without departing from the scope of the invention, it is intended that all matter contained in the above description or shown in the accompanying drawings, shall be interpreted as illustrative and not in a limiting sense. For example, although an infrared detection system has been described as the sensing apparatus, other systems for detecting variations in emittance or reflectance of energy in the ultraviolet region, microwave region, or other areas of the electromagnetic spectrum may be used.

In addition, various changes may be made in the order of the bonding operation. For example, although only one sensing step has been shown in the bonding process as described, a number of such steps may be utilized in series or spaced alternatively with the various surface preparation operations, each inspection step "looking for" a specific class of contaminants. It is also pointed out that the sensing process of this invention may be utilized in all types of bonding operations, and with all types of materials that require smooth contaminant-free surfaces prior to being joined. Various other modifications may become apparent to persons skilled in the art without departing from the spirit and scope of the invention as defined by the appended claims.

What is claimed is:

1. Apparatus for bonding at least two members, comprising:
 (a) means for cleaning the mating surfaces of said members to be bonded,
 (b) means for scanning the mating surfaces of said members to be bonded for variations in emittance of infrared energy from said mating surfaces, thereby to detect the presence of bond deterrent contaminants upon said mating surfaces,
 (c) means for further cleaning the mating surfaces of said members to be bonded,
 (d) control means responsive to said detection by said second mentioned means to cause said mating surfaces to be further cleaned by said third mentioned means to remove said detected bond deterrent contaminants, and
(e) means for effecting a bond between said members.

2. Apparatus for bonding at least two members, comprising:
(a) means for cleaning the mating surfaces of said members to be bonded,
(b) means for scanning the mating surfaces of said members to be bonded for variations in reflectance of electromagnetic energy from said mating surfaces, thereby to detect the presence of bond deterrent contaminants upon said mating surfaces,
(c) means for further cleaning the mating surfaces of said members to be bonded,
(d) control means responsive to said detection by said second mentioned means to cause said mating surfaces to be further cleaned by said third mentioned means to remove said detected bond detected bond deterrent contaminants, and
(e) means for effecting a bond between said members.

References Cited

UNITED STATES PATENTS

| | | | |
|---|---|---|---|
| 2,691,815 | 10/1954 | Boessenkool | 29—488 |
| 3,020,745 | 2/1962 | Sielicki | 29—407 |
| 3,048,699 | 8/1962 | Francis | 250—83.3 |
| 3,160,752 | 12/1964 | Bennett | 250—83.3 |
| 3,206,603 | 9/1965 | Mauro | 250—83.3 |
| 3,210,838 | 10/1965 | Nast | 29—488 X |
| 3,222,978 | 12/1965 | Dreyfus | 88—14 |
| 3,280,692 | 10/1966 | Milnes | 88—14 |

JOHN F. CAMPBELL, *Primary Examiner.*

R. F. DROPKIN, *Assistant Examiner.*